United States Patent [19]
Martin

[11] Patent Number: 5,216,966
[45] Date of Patent: Jun. 8, 1993

[54] HEAT GENERATING PLANT COMPRISING DESULFURIZATION MEANS UTILIZING REGENERATABLE ABSORBENTS

[75] Inventor: Gerard Martin, Rueil Malmaison, France

[73] Assignees: Institut Francais du Petrole, Rueil-Malmaison; Babcock Entreprise, La Courneuve, both of France

[21] Appl. No.: 822,208

[22] Filed: Jan. 17, 1992

[30] Foreign Application Priority Data

Jan. 17, 1991 [FR] France ............................ 91 00546

[51] Int. Cl.$^5$ .............................................. F23J 3/00
[52] U.S. Cl. ................................... 110/216; 110/203; 110/345; 423/244.1
[58] Field of Search ............... 110/344, 345, 347, 203, 110/216; 423/210, 233, 242, 244

[56] References Cited

U.S. PATENT DOCUMENTS

| | | | |
|---|---|---|---|
| 4,312,280 | 1/1982 | Shearer et al. | 110/347 |
| 4,590,049 | 5/1986 | Staudinger | 110/345 X |
| 4,603,037 | 7/1986 | Yoon | 110/345 X |
| 4,782,772 | 11/1988 | Chughtai et al. | 110/345 |

*Primary Examiner*—Edward G. Favors
*Attorney, Agent, or Firm*—Antonelli, Terry, Stout & Kraus

[57] ABSTRACT

A heat-generating plant comprising a combustion chamber (1), at least one convective exchange zone (4, 9), a desulfurization chamber (6) comprising at least one means (8) for injecting an absorbent and communicating with a chamber (13) linked to said first convective exchange zone (9), said separation chamber having at least one outlet (132, 133) for the spent absorbent and an outlet (14) for the depolluted gases. The plant also comprises:
  means (32) for regenerating the spent absorbent, and
  means (38, 41) intended to treat the absorbent and/or the regeneration gases coming from said regeneration means (32).

A means (16) for the intermediate storage of the spent absorbent can also be provided in the plant.

17 Claims, 1 Drawing Sheet

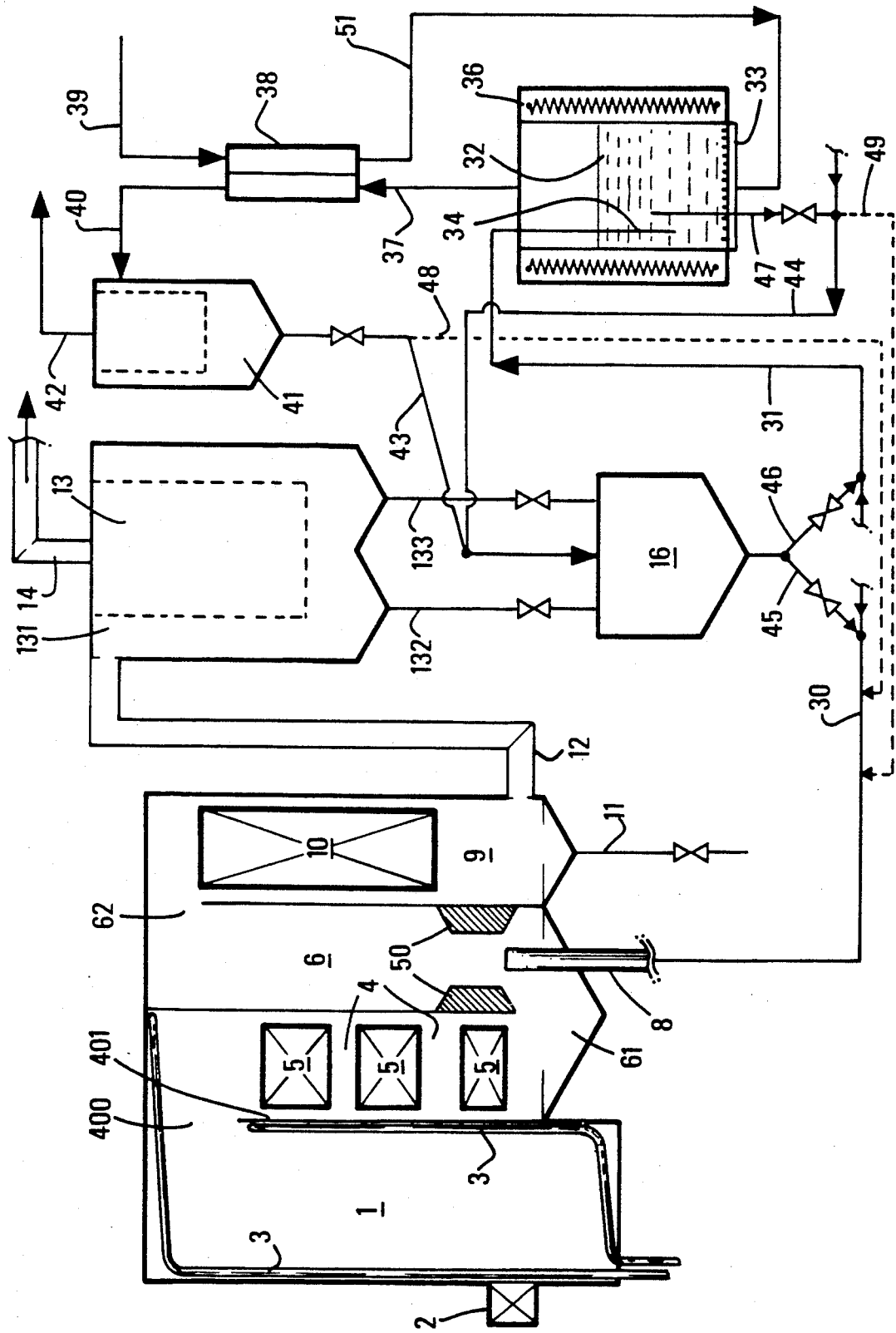

HEAT GENERATING PLANT COMPRISING DESULFURIZATION MEANS UTILIZING REGENERATABLE ABSORBENTS

BACKGROUND OF THE INVENTION

The present invention relates to a plant intended to generate heat from the combustion of a fuel containing notably sulfur and nitrogen, with limited emissions of sulfur oxides.

Several publications describe how to reduce the emissions of sulfur oxide and more specifically of sulfur dioxide coming from a boiler of the type cited above.

These boilers conventionally comprise a combustion chamber, at least one convective exchange zone, a desulfurization chamber comprising at least one means for injecting an absorbent and communicating with a first convective exchange zone, a first separation chamber connected to said first convective exchange zone, said separation chamber having at least one outlet for the spent absorbent and an outlet for the depolluted gases.

Patent application FR-A-2,636,720, discloses a boiler known as "desulfurizing" boiler and comprising a desulfurization chamber arranged between a combustion chamber (upstream) and a heat recovery chamber (downstream), the assembly having the advantage of being compact since the desulfurization chamber is integrated between the combustion chamber and the heat recovery chamber.

French Patent application FR-90/08,311 is an improvement of the previous application since it provides, in order to keep a constant temperature in the desulfurization chamber, whatever the variations of the rating of the boiler may be, for recycling of a part of the absorbent used, towards the inlet of the desulfurization chamber, the rate of flow of this recycling being furthermore controlled.

The absorbent injected in these boilers mainly consists of a calcic matter which is sent, after partly sulfurizing, towards a storage hopper.

This type of "desulfurizing" boiler therefore leads to the production of not insignificant amounts of spent calcic absorbent, i.e. desulfated. In the end, the amount of discharged absorbent may pose storage problems, which is quite understandable.

The calcic absorbents can represent each year several millions, and even several ten millions of tons of waste to be stocked, hence a storage volume problem. Besides, during the storage thereof, the absorbents can be wetted, washed and therefore release the metallic pollutants they contain, thereby polluting the phreatic surface sheets.

SUMMARY OF THE INVENTION

The present invention actually aims at solving the above-mentioned problems and also at allowing the capture of the sulfur oxides at a temperature lower than in the systems already known.

These aims are reached by means of a plant of the type defined at the beginning of the description and which comprises, according to the invention :

- a means for regenerating the spent absorbent and working with reducing agents, and
- means intended to treat the absorbent and/or the regeneration gases coming from said regeneration means.

Besides, the plant according to the invention advantageously comprises means for the intermediate storage of the spent absorbent.

In a characteristic way, the absorbent which is used is essentially made up of a regeneratable magnesian absorbent.

The desulfurization chamber is particularly interposed between two convective exchange zones.

The means for regenerating the spent absorbent advantageously comprises at least a first outlet for the regeneration gases and a second outlet intended for the. regenerated solids, and the second outlet can be connected to an inlet of the intermediate storage means, or to the desulfurization chamber.

The means for regenerating the spent absorbent is preferably of the fluidized bed type and comprises a plurality of inlets for a reducing gas, intended to deliver said reducing gas over the whole section of the bed.

The means for the intermediate storage of the absorbent advantageously comprises at least one first outlet linked to an inlet of said means for regenerating the absorbent.

Besides, the means for the intermediate storage of the absorbent can comprise a second outlet linked to said means for injecting the absorbent into said desulfurization chamber.

According to another feature of the invention, the plant comprises a second separation chamber supplied by said regeneration gases coming from said regeneration means, and fitted with at least one first outlet for the gases cleared of most of the absorbent particles and with a second outlet for the regenerated solid absorbent.

BRIEF DESCRIPTION OF THE DRAWING

The invention will be further apparent from the following detailed description given for information by way of non limitative examples, with reference to the accompanying single FIGURE.

This FIGURE shows a plant according to the invention which comprises an oblong combustion chamber 1, preferably vertical, in which a fuel notably containing sulfur can burn. The fuel can be for example a petroleum residue, a gas comprising sulfurized compounds, or coal.

DESCRIPTION OF THE PREFERRED EMBODIMENTS

The combustion chamber is equipped with at least one burner such as 2 preferably located in the lower part of chamber 1. Part of the energy produced by the burners during the combustion is advantageously transmitted to a heat exchange circuit by means of exchange pipes 3 located near the walls of combustion chamber 1.

The temperature of the gaseous effluents in the combustion chamber therefore generally ranges between 800° and 2,000° C.

An opening 400 located in the upper part of the combustion chamber provides a communication with a first convective exchange zone 4.

This zone 4, which has a wall 401 that is shared by combustion chamber 1, is crossed by the combustion fumes driven by a downward vertical motion. Exchangers 5 are advantageously located in zone 4, so that the temperature of the effluent gases at the level of the outlet 61 of this exchange zone 4 ranges between 400° and 800° C.

The convective exchange zone 4 can also be equipped with any means known by the man skilled in the art which allow to keep the temperature constant at the outlet of this zone 4, whatever the flow of the gas crossing it may be, without departing from the scope of the invention.

Outlet 61 of the convective exchange zone 4 is also the inlet of a desulfurization chamber 6. Absorbent injectors 8 are fastened close to the outlet 61, i.e. in the lower part of the desulfurization chamber. These injectors are intended to inject the absorbent in an appropriate way, in order to obtain a fast dispersing of the absorbent in the stream of fumes to be treated. The grain size of the absorbent ranges for example between 0.1 and 200 micrometers, preferably between 1 and 20 micrometers.

The walls of the desulfurization chamber 6 can comprise membrane tubes. Besides, singularities 50 can be placed in the lower part of desulfurization chamber 6 in order to favour the swirl and the mixing of the absorbent with the fumes to be treated.

Injecting the absorbent will preferably be performed pneumatically by any well-known means, through a specific pipe 30.

The swirling mixture thus flows upwards through desulfurization chamber 6, at a speed such that the whole absorbent is carried along towards the outlet of chamber 6.

Outlet 62 of the desulfurization chamber 6 is therefore preferably located in the upper part of the desulfurization chamber.

The residence time of the gases in the desulfurization chamber can range between 0.1 and 4 seconds, preferably between 0.5 and 1.5 seconds.

The mixture then passes into a second convective exchange zone 9, in which it is driven by a downward vertical motion.

The second convective exchange zone 9 is for example equipped with one or several exchangers 10, of a type known by the man skilled in the art, in order to cool the mixture.

An exhaust port 11 can also be provided in the lower part of the second convective exchange zone 9 for the solids which may eventually have sedimented in the second convective exchange zone.

At the outlet of the second convective exchange zone 9, the major part of the fumes is carried along via an appropriate pipe 12 towards the inlet 131 of a unit 13 intended to separate the solids from the gases and known as "dust collector". This unit 13, which is well-known in itself, can for example be a bag filter or an electrostatic precipitator in which the spent absorbent particles are collected while the effluent gases, cleared of most of their pollutants, are discharged through a pipe 14, for example towards a vent chimney.

The plant which has been described and the associated working process belong to the prior art such as defined at the beginning of the description, except for some modifications.

In a different way, according to the invention, the absorbent that is used is essentially a regeneratable absorbent, preferably a magnesian one.

The regenerating capacity of the absorbent implies numerous advantages which have been briefly cited in the introductory part of the description and which will be described in a more detailed way hereafter.

This feature, of course, requires a certain conversion of the plant, as presented hereunder.

The outlet of separation unit 13, on the side of the spent absorbent, can comprise two pipes 132, 133 which end in an intermediate storage hopper 16.

From this hopper 16, part of the spent absorbent can be directly sent back towards the injector(s) 8 of desulfurization chamber 6 through a line 45 and then through injection line 30. The injection via line 30 will preferably be performed pneumatically, by means of air or steam.

The absorbent will thus perform a new absorption cycle by mixing again with the fumes to be treated, at the level of desulfurization chamber 6.

Besides, another part of the absorbent coming out of intermediate storage hopper 16 is directed, via two successive pipes 46 and 31, towards a regeneration device 32. A valve can be advantageously placed on each one of pipes 45, 46 in order to control the flow rate of the spent (or sulfated) absorbent.

However, intermediate storage hopper 16 is not essential for the invention. Dividing the flow rate of the absorbent can be considered at the outlet of separation unit 13, in order to send the absorbent at the same time towards desulfurization chamber 6 and towards regeneration device 32.

Regeneration device 32 works for example as a dense fluidized bed as explained hereafter. The sulfated absorbent is introduced inside the fluidized bed through a dip rod 34. The fluidized bed preferably works at a temperature of about 650° C.

The energy that is necessary to keep this temperature is obtained through electric heating elements 36 arranged around the tank containing the fluidized bed. It is in fact important for the progress of the reaction within the fluidized bed to keep a specific temperature in the reaction zone.

The regeneration reducing gas can be introduced at the level of the bottom of the tank via a pipe 51 and a heat exchanger 38 intended for preheating the gas. A diffuser 33 allows to deliver this gas uniformly over the whole section of the fluidized bed.

The reducing agents which are used are for example hydrogen, hydrogen sulfide, natural gas, refinery gases, . . . The regeneration reducing gas can be diluted in a chemically inert gas.

At the outlet of the regenerator, i.e. after passing through fluidized bed 32, the gases which contain hydrogen sulfide and/or sulfur dioxide and which contain all or part of the regenerated absorbent, as well as the residual reducing agent, are discharged through a pipe 37 and flow through heat exchanger 38 where they are cooled.

The gases cooled thereby are sent towards a second separation unit (or dust collector) 41 which discharges on one hand the regenerated absorbent through a first pipe 43 and, on the other hand, the regeneration gases cleared of the absorbent particles via a second pipe 42.

The regenerated absorbent can be directed through the first pipe 43 towards intermediate storage hopper 16. It can also be considered directing the regenerated absorbent directly towards desulfurization chamber 6 as shown by the dotted line 48, without departing from the scope of the invention.

The regenerated absorbent can also be extracted through a withdrawal line 47 going out from the bottom of the tank of regeneration device 32. The absorbent extracted at this level can be sent back into intermediate storage hopper 16 through an appropriate pipe 44. This absorbent can also be directly sent back towards desulfurization chamber 6 through a line 49 (dot-and-dash line in the FIGURE).

As for the regeneration gases cleared of the particles of regenerated absorbent, coming from the second separation unit 41, they can be sent towards a treatment unit (not shown) intended to separate and collect the sulfur and/or the sulfur derivatives.

Once the gas is cleared of the sulfurized elements, it can be advantageously reintroduced into regeneration device 32 through a pipe 39 leading the gas either directly into the tank, or by passing through heat exchanger 38.

All that has been described so far shows that the magnesian absorbents can carry out absorption cycles and regeneration cycles alternately. Tests have shown that they can perform 500 to 50,000 cycles before being discharged definitively. The discharge of spent absorbent is therefore decreased by a 500 to 50,000 factor in relation to a desulfurizing boiler utilizing no magnesian absorbent, which is considerable.

The very small amounts of spent absorbent discharged allow for example to consider vitrifying the discharges before the definitive storage thereof. It is also possible to recover these metals through an appropriate wet treatment. These possible treatments of the spent absorbent, which are simple and easy to control, therefore decrease considerably the risks of contamination of the phreatic
surface sheets.

Besides, using magnesian absorbents allows to concentrate the heavy metals such as vanadium, nickel, chromium, manganese, cobalt, zinc collected in the fumes.

Moreover, the sulfur generated by the combustion can be collected as it is (by means of a Claus plant), and afterwards retreated, i.e. upgraded.

Lastly, the additional energy consumption generated by the use of regeneratable absorbents is low since it ranges between 0.2 and 2% of the total power of the boiler.

Other modifications and/or additions can be brought to the plant which has been described without departing from the scope of the invention.

Regeneration device 32 can thus be for example a revolving furnace instead of a tank working with a fluidized bed.

I claim:

1. A heat-generating plant comprising a combustion chamber, at least one convective exchange zone in communication with the combustion chamber, a desulfurization chamber communicating with a first convective exchange zone of the at least one convective exchange zone, at least one means for injecting an absorbent into the desulfurization chamber, a first separation chamber in communication with said first convective exchange zone, said separation chamber having at least one outlet for spent absorbent and an outlet for desulfurized effluent gases; said plant further comprising means operatively associated with the separation chamber for regenerating the spent absorbent by contacting the spent absorbent with a reducing agent and means for treating at least one of the absorbent and regeneration gases coming from said regeneration means.

2. A plant according to claim 1 further comprising means for effecting intermediate storage of the spent absorbent received from the separation chamber.

3. A plant according to claim 1, wherein the absorbent comprises a regeneratable magnesian absorbent.

4. A plant according to claim 1, wherein said desulfurization chamber is interposed between the first convective exchange zone and a second convective exchange zone, said desulfurization chamber being separated from the combustion chamber by the first convective exchange zone.

5. A plant according to claim 1, wherein said means for regenerating spent absorbent includes at least one first outlet for discharging the regeneration gases and a second outlet for discharging regenerated absorbent solids.

6. A plant according to claim 5, wherein the second outlet is in communication with an intermediate storage means connected to said separation chamber.

7. A plant according to claim 5, wherein said second outlet is in communication with the means for injecting the absorbent into the desulfurization chamber.

8. A plant according to claim 1, wherein said reducing agent comprises a reducing gas and wherein said means for regenerating spent absorbent comprises a fluidized bed and means for introducing the reducing gas into said bed including a plurality of inlets arranged to delivery the reducing gas over the entire cross section of the bed.

9. A plant according to claim 1, wherein said means for regenerating spent absorbent comprises a revolving furnace.

10. A plant according to claim 2, wherein said means for effecting intermediate storage of the spent absorbent comprises at least one first outlet in communication with an inlet of said means for regenerating the absorbent.

11. A plant according to claim 10, wherein said means for effecting the intermediate storage of the spent absorbent also comprises a second outlet in communication with said means for injecting the absorbent into said desulfurization chamber.

12. A plant according to claim 1, wherein said means for treating the regenerated absorbent comprises a second separation chamber supplied by said regeneration gases exiting from said regeneration means, said second separation chamber having at least one first outlet for gases freed of absorbent particles and a second outlet for regenerated absorbent solids.

13. A plant according to claim 2, wherein said second outlet of the second separation chamber is connected to the intermediate storage means in order to supply said intermediate storage means with regenerated absorbent solids.

14. A plant according to claim 12, wherein said second outlet of the second separation chamber is connected in communication with the at least one means for injecting absorbent into said desulfurization chamber.

15. A plant according to claim 2, wherein said first outlet is connected to a treatment unit for said gases freed of the absorbent particles.

16. A plant according to claim 15, wherein said treatment unit supplies reducing gas to said regeneration means.

17. A plant according to claim 1, wherein said reducing agent comprises a reducing gas and said means for treating the gases coming from the regeneration means comprises a heat exchanger providing heat exchange between reducing gas introduced into said regeneration means and the regeneration gases exiting from said regeneration means.

* * * * *